US010311298B2

(12) United States Patent
Ovsiannikov et al.

(10) Patent No.: US 10,311,298 B2
(45) Date of Patent: Jun. 4, 2019

(54) BIOMETRIC CAMERA (71) Applicant: Samsung Electronics Co., Ltd., Gyeonggi-do (KR)

(72) Inventors: Ilia Ovsiannikov, San Jose, CA (US); Yibing Michelle Wang, San Jose, CA (US); Yong-Hwa Park, San Jose, CA (US); Yong-Chul Cho, San Jose, CA (US); Heesun Yoon, San Jose, CA (US); ChangYoung Park, San Jose, CA (US); Dirk Smits, San Jose, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/968,578

(22) Filed: May 1, 2018

(65) Prior Publication Data
US 2018/0268215 A1  Sep. 20, 2018

Related U.S. Application Data (63) Continuation of application No. 14/500,674, filed on Sep. 29, 2014, now Pat. No. 9,971,937.

(60) Provisional application No. 61/884,778, filed on Sep. 30, 2013, provisional application No. 61/885,291, (Continued)

(51) Int. Cl.
| G06K 9/00 | (2006.01) |
| G06F 21/32 | (2013.01) |
| G06T 7/586 | (2017.01) |
| G06K 9/46 | (2006.01) |
| G07C 9/00 | (2006.01) |

(52) U.S. Cl.
CPC ......... *G06K 9/00604* (2013.01); *G06F 21/32* (2013.01); *G06K 9/00033* (2013.01); *G06K 9/00617* (2013.01); *G06K 9/4609* (2013.01); *G06T 7/586* (2017.01); *G06T 2207/20201* (2013.01); *G07C 9/00158* (2013.01)

(58) Field of Classification Search
CPC .......... G06K 9/00604; G06K 9/00617; G06K 9/00033; G06K 9/4609; G06F 21/32; G07C 9/00158; G06T 2207/20201; G06T 7/586
USPC ....................................................... 382/117
See application file for complete search history.

(56) References Cited

U.S. PATENT DOCUMENTS

| 7,369,759 B2 | 5/2008 | Kusakari |
| 7,652,685 B2 | 1/2010 | Wach |
| 8,085,994 B2 | 12/2011 | Kim |
| (Continued) | | |

*Primary Examiner* — Amandeep Saini
(74) *Attorney, Agent, or Firm* — Van Pelt, Yi & James LLP (57) ABSTRACT Exemplary embodiments for a biometric camera system for a mobile device, comprise: a near infrared (NIR) light source on the mobile device that flashes a user of the mobile device with near infrared light during image capture; a biometric camera located on the mobile device offset from the NIR light source, the biometric camera comprising: an extended depth of field (EDOF) imaging lens; a bandpass filter located adjacent to the EDOF imaging lens to reject ambient light during image capture; and an imaging sensor located adjacent the bandpass filter that converts an optical image of an object into an electronic signal for image processing; and a processor configured to receive video images of an iris of a user from the image sensor, and attempt to match the video images of the iris with previously registered images stored in an iris database, wherein if a match is found, the user is authenticated.

13 Claims, 3 Drawing Sheets

Related U.S. Application Data filed on Oct. 1, 2013, provisional application No. 61/913,620, filed on Dec. 9, 2013.

(56) References Cited

U.S. PATENT DOCUMENTS

| | | | |
|---|---|---|---|
| 2006/0098097 A1* | 5/2006 | Wach | G02B 27/0025 348/207.99 |
| 2007/0147811 A1* | 6/2007 | Nakao | A61B 3/113 396/18 |
| 2009/0245594 A1* | 10/2009 | Abramovich | G06K 9/00604 382/117 |
| 2012/0281280 A1 | 11/2012 | Buehler | |
| 2013/0236066 A1 | 9/2013 | Shubinsky | |

* cited by examiner

BIOMETRIC CAMERA

CROSS-REFERENCE TO RELATED APPLICATIONS

This application is a continuation of U.S. patent application Ser. No. 14/500,674, filed Sep. 29, 2014, entitled "BIOMETRIC CAMERA", and claims the benefit of Provisional Application Ser. No. 61/884,778, filed Sep. 30, 2013; Provisional Application Ser. No. 61/885,291, filed Oct. 1, 2013; and Provisional Application Ser. No. 61/913,620, filed Dec. 9, 2013, each assigned to the assignee of the present application, and incorporated herein by reference.

BACKGROUND

Mobile devices such as laptops—and most recently smartphones—have included biometric devices with the purpose of user identification. The biometric devices for example include fingerprint scanners, iris scanners and camera systems capable of face and/or voice recognition. However, fingerprint identification systems suffer from the fact that users routinely leave fingerprints on various objects—and those fingerprints can be "lifted" and reproduced to circumvent fingerprint identification systems. Also, face and voice recognition systems may not be sufficiently accurate and can often be circumvented with relative ease. In this situation, iris scanning systems may be of particular interest because they are relatively more difficult to circumvent, while being very accurate and easy to use.

Various camera systems exist to capture images of the iris. In particular, there is interest in providing a biometric camera system that can be realized in a mobile device such as a smartphone or tablet. Such biometric camera systems face a number of challenges during their operation, including 1) ambient illumination (e.g. be able to operate in full sunlight); 2) motion blur (e.g. user's hand shaking while holding the smartphone and capturing iris); 3) depth of field at close distances (e.g. while taking pictures at short ("macro") distances, the object being further or closer than the focused distance makes the image blurry); 4) additional cost and additional space for a biometric sensor; and 5) limited field of view (e.g., the camera must capture a high-resolution image of the iris for reliable identification. Since the iris is small—e.g. 12 mm in diameter—while the distance between the camera and the iris is considerable—e.g. arm's length, ~25 cm—the camera must be considerably "zoomed in" on the face and iris area, rather than image the user and his/her surroundings as in a wide-angled shot).

Therefore, a need exists to provide a biometric camera system that is capable of addressing the above issues.

BRIEF SUMMARY

Exemplary embodiments for a biometric camera system for a mobile device, comprise: a near infrared (NIR) light source on the mobile device that flashes a user of the mobile device with near infrared light during image capture; a biometric camera located on the mobile device offset from the NIR light source, the biometric camera comprising: an extended depth of field (EDOF) imaging lens; a bandpass filter located adjacent to the EDOF imaging lens to reject ambient light during image capture; and an imaging sensor located adjacent the bandpass filter that converts an optical image of an object into an electronic signal for image processing; and a processor configured to receive video images of an iris of a user from the image sensor, and attempt to match the video images of the iris with previously registered images stored in an iris database, wherein if a match is found, the user is authenticated.

BRIEF DESCRIPTION OF SEVERAL VIEWS OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Advantages and features of the present invention and methods of accomplishing the same may be understood more readily by reference to the following detailed description of embodiments and the accompanying drawings. The present general inventive concept may, however, be embodied in many different forms and should not be construed as being limited to the embodiments set forth herein. Rather, these embodiments are provided so that this disclosure will be thorough and complete and will fully convey the concept of the general inventive concept to those skilled in the art, and the present general inventive concept will only be defined by the appended claims. In the drawings, the thickness of layers and regions are exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "component" or "module", as used herein, means, but is not limited to, a software or hardware component, such as a field programmable gate array (FPGA) or an application specific integrated circuit (ASIC), which performs certain tasks. A component or module may advantageously be configured to reside in the addressable storage medium and configured to execute on one or more processors. Thus, a component or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules may be combined into fewer components and components or modules or further separated into additional components and components or modules.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

According to the method and system disclosed herein, the exemplary embodiments provide a mobile device with a biometric camera system for reliable iris identification and user authentication. The camera is capable of working at high levels of ambient illumination, capturing images practically without motion blur, provides considerable latitude in distances at which a clear image can be captured and can be realized in a small form factor. Additionally, the camera can optionally perform functions including proximity sensing, night-vision camera, 3D time-of-flight sensor, eye position and gaze tracking camera, and structured light for 3D sensing. Combined with a user-facing front-face camera, the system can automatically identify whether the left and/or right eye is being imaged.

Figure 1:
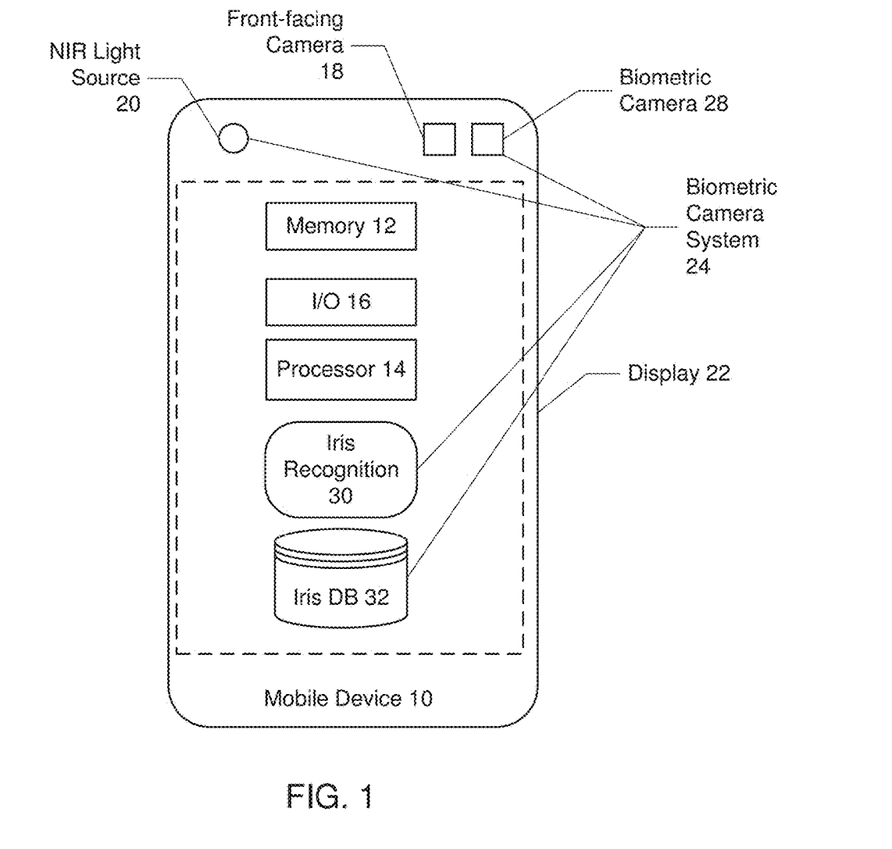
FIG. 1 is a block diagram illustrating an exemplary embodiment of a mobile device biometric camera system.

FIG. 1 is a block diagram illustrating an exemplary embodiment of a mobile device biometric camera system. The system includes a mobile device 10 having conventional components including a memory 12, at least one processor 14, input output devices (I/O) 16, an front-facing camera 18 (e.g., RGB camera), and a display 22.

The memory 12, the processor 14, the I/O 16, the front-facing camera 18 and the display 22 may be coupled together via one or more system buses (not shown). The memory 12 may comprise one or more memories comprising different memory types, including RAM, ROM, cache, virtual memory and flash memory, for example. The processor 14 may include a single processor having one or more cores, or multiple processors having one or more cores. The I/O 16 is a collection of components that input information and output information. Example components comprising the I/O 16 may include a microphone, speaker, and a wireless network interface controller (or similar component) for communication over the network. The processor 14 may execute an operating system (OS) that manages hardware resources and performs basic tasks. Examples of the OS may include Symbian™, BlackBerry OS™, iOS™, Windows™, and Android™. In one embodiment, the display 22 may be integrated with the mobile device 10, while in another embodiment, the display 22 may be external from the mobile device 10.

In one embodiment, the mobile device 10 may comprise any type of mobile device form factor, including but not limited to, a cell or smart-phone, a tablet, a notebook or laptop computer, a television, and a wearable computer, for example. In one embodiment, the mobile device 10 may be implemented with the display 22 and the front-facing camera 18 located on the same side of the mobile device 10, such that the front-facing camera 18 is pointed at the user has the user holds the device to view the display 22. In the embodiment where the mobile device 10 comprises a laptop or notebook, the front-facing camera is typically housed within a lid of the laptop.

According to the exemplary embodiment, the mobile device 10 is provided with a biometric camera system 24 that is used to capture images of the human iris for user identification and authentication. In one embodiment, the biometric camera system 24 may include a near infrared (NIR) light source 20, a biometric camera 28, an iris recognition component 30 and an iris database 32. In one embodiment, the iris recognition component 30 and the iris database 32 may be software components stored in the memory 12 and executed by the processor 14.

As shown, in one embodiment the biometric camera 28 may be located in one corner of the mobile device 10 (although other locations are also possible), while the NIR light source 20 may be located in an opposite corner to offset the NIR light source 20 from the biometric camera 28 within the body of the mobile device 10. In one embodiment, the NIR light source 20 may be implemented using micro light emitting diodes (LEDs) or a laser diode, and the NIR light source 20 may be slightly angled upwards to point into the user's eye located at an expected distance when held normally by the user.

In operation, the NIR light source 20 flashes a user of the mobile device 10 with near infrared light during image capture of the user's iris by the biometric camera 28. Video images output from the biometric camera 28 are received by the iris recognition component 30, which attempts to match the image of the iris with previously registered images stored in the iris database 32. If a match is found, then the user may be authenticated.

Figure 2:
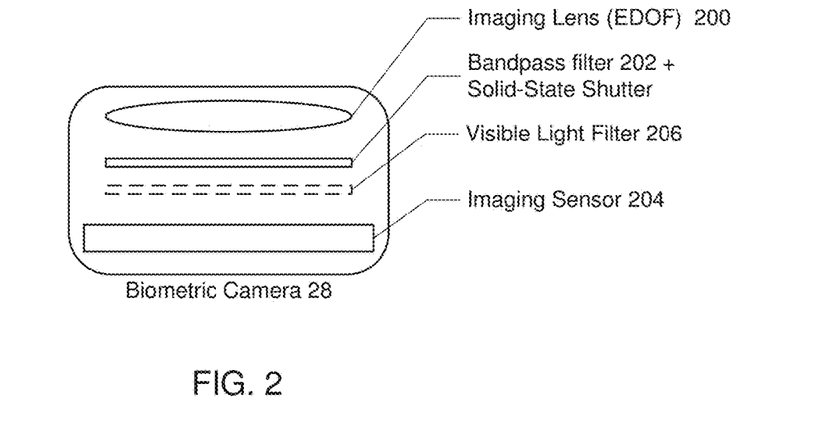
FIG. 2 is a block diagram illustrating components of the biometric camera for a mobile device according to an exemplary embodiment.

FIG. 2 is a block diagram illustrating components of the biometric camera 28 according to an exemplary embodiment. In one embodiment, the biometric camera 28 may operate to gather reflected near infrared light and form an image of a human iris using a combination of an imaging lens 200, a bandpass filter 202, and an imaging sensor 204. According to the exemplary embodiment, the imaging lens 200 may comprise an extended depth of field (EDOF) imaging lens.

The bandpass filter 202 may be located adjacent to the imaging lens 200 and functions to reject ambient light. In a preferred embodiment, the bandpass filter 202 may be combined with a solid-state shutter. In one embodiment, the band pass filter may comprise a near-infrared bandpass filter. As shown with the dashed lines, the biometric camera 28 may also include an optional visible light filter 206 located adjacent to the bandpass filter 202 and optional solid-state shutter that may be used to further reject visible light.

The imaging sensor 204 may be located adjacent to the bandpass filter 202 and converts an optical image of an object (e.g., an iris) into an electronic signal for subsequent image processing. In one embodiment, the image sensor 204 may include a built-in rolling shutter or a freeze-frame shutter. In one embodiment, the image sensor 204 may comprise a digital charge-coupled device (CCD) or complementary metal-oxide-semiconductor (CMOS) active pixel sensors.

In one embodiment, the biometric camera system 28 is designed to have a very small size to fit into a mobile device 10, such as a smartphone, and to also be low in cost. To meet these design goals, in one embodiment the image sensor 204 may comprise a CMOS sensor with a small pixel pitch, e.g., 1.1 µm, and a rolling shutter (not freeze-frame). Such a sensor type is commercially available and used in smartphones for front and back-facing cameras. Thus, the preferred embodiment utilizes an off-the-shelf black-and-white CMOS sensor with rolling shutter and small pixels.

The bandpass filter 202 may function to reject all wavelengths except near-infrared, e.g., 800 nm+−5 nm. In a preferred embodiment, the bandpass filter 202 may be combined a solid-state shutter. The process of capturing an image comprises:

1) Starting the image sensor in a mode where the image sensor is exposing the entire frame simultaneously;
2) Opening the solid-state shutter simultaneously while pulsing the NIR light source;
3) Closing the solid-state shutter; and
4) Reading out the captured image from the image sensor.

One goal may be to make the exposure time (when the solid-state shutter is open and the NIR light source is enabled) to be as short as practically possible. To compensate for the short exposure time, the NIR light source power may be made as high as practically possible without damaging the human eye. By keeping the solid-state shutter closed at all times except during capture, the ambient light received from elsewhere in the scene may be significantly reduced. This achieves the goal of rejecting ambient illumination. Also, due to the very short exposure time, the goal of practically motion blur-free image capture may be achieved.

In one embodiment, the solid-state shutter may comprise gallium arsenide (GaAs). This type of shutter can change its state from opaque to transparent in a very short time (several nanoseconds) by applying voltage externally. Using a GaAs-based shutter as a filter is particularly desirable in this application since this type of shutter has a high index of refraction. Typical dichroic ("interference") optical bandpass filters often have a relatively wide bandpass width due to the dependence of the central wavelength on the angle of incidence. In camera systems, light rays can pass through the optical filter at various angles. Since the bandpass wavelength shifts as a function of incoming light ray angle, it is typical to make the bandpass wide, such that regardless of the incoming ray angle, light energy of the desirable wavelength in that ray can still pass through the optical filter. The amount of shift of the center wavelength is determined as $$\lambda_c = \lambda_0 \sqrt{1 - \frac{\sin^2 \theta}{n^{*2}}}$$

Where λc is the central wavelength, λ0 is the central wavelength at normal incidence, and n* is the filter effective index of refraction. Since GaAs has a high n*, the shift effect is reduced, the filter can be designed to have a narrower bandwidth—and thus reject even more ambient light.

Alternatively, instead of using a solid state shutter, a CMOS sensor with a built-in freeze-frame shutter and NIR bandpass shutter (possibly also GaAs) may be used. However, CMOS sensors with a freeze-frame shutter typically have pixels of larger size compared to CMOS sensors utilizing rolling shutter. Larger pixel size reduces image resolution—or increases sensor size and cost. Larger pixel size also reduces the depth of field, as explained below. This is why the use of GaAs solid shutter is preferred.

Figure 3:
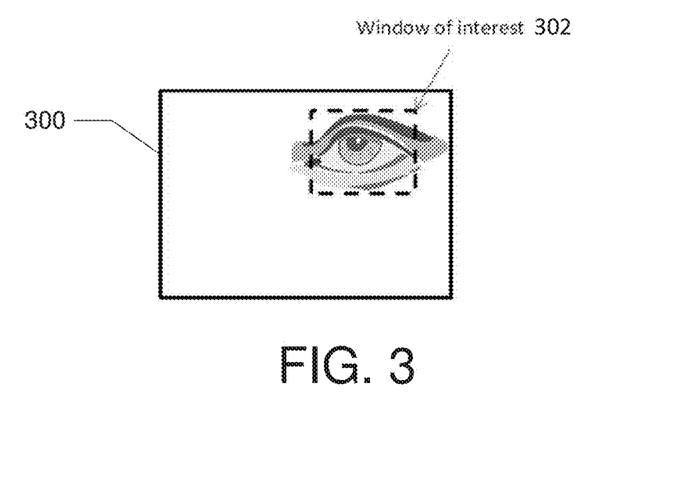
FIG. 3 a diagram illustrating the captured image bounded by a frame in which a window of interest containing an iris has been identified.

A solid-state shutter, such one based on GaAs, may still leak some light in its closed state. If the image sensor 204 continues sensing an image while the image is read out, which is typical in image sensors utilizing rolling shutter, the leaking ambient light can register in the captured image and adversely affect the image quality, e.g., by saturating some image areas or adding noise to the image. In one embodiment, the processor may be configured to reduce exposure from ambient light by reducing exposure and readout time as follows:

1) Start exposure of the image sensor 204, in particular in sensors with a rolling shutter, using a global reset to clear charge from all pixels simultaneously, thereby reducing time during which ambient light can be sensed; and
2) Reduce the readout time by identifying iris position from a previously captured image and defining a window of interest around the iris position, and subsequently capturing and reading out from a portion of the image sensor defined by the window of interest. For example, as shown in FIG. 3, a previously captured image is shown bounded by frame 300, and a window of interest 302 is identified containing the iris, which is smaller than the entire frame.

In one embodiment, the NIR light source may be synchronously pulsed with the readout of the rolling shutter. In this embodiment, the rolling shutter may be addressed in a row-column manner where only the pixels in the window of interest 302 are read out. For example, the NIR light source may turned on at or slightly before the time where the upper left of the window of interest 302 is read out and then turned off after the lower right pixel of the window of interest 302 has been read. In a particular embodiment, the rejection of ambient light can be made greater by pulsing at a higher light intensity. The total and instantaneous amounts of NIR light must be below certain thresholds to avoid eye damage. Because the NIR light is only turned on while exposing and reading the window 302, the intensity of the light may be increased during this period than would be allowed for eye safety if it were used while exposing and reading the entire frame 300. The increased intensity of light enables a shorter exposure and readout time, leading to less ambient light readout.

In one embodiment, a rolling shutter is used to read entire lines rather than a small window 302. In this case, the shutter resets the pixels and reads out at the top of the window 302 and finishes reading at the bottom of the window. In one embodiment, the NIR light may be turned on and off to synchronize with the beginning and end of this readout. As this slice of the frame 300 is smaller than the full frame, the intensity of the pulsed NIR may be higher than if exposing the full frame. In a particular embodiment, the NIR light may be further pulsed to synchronize with each line readout. Here, although the full lines are being read out, the NIR is only turning on while exposing the window of interest 302. The instantaneous intensity may be made even higher in this embodiment than in the previous one, even though the total NIR flux may be reduced.

Depth of Field

The biometric camera 28 should typically capture an iris image at distances of around 25 cm. At such short distances depth of field is typically limited and it is difficult to obtain a sharp image. To increase the depth of field, the exemplary embodiments may include:

1) Using EDOF (extended depth of field) techniques, in particular wavefront coding type of EDOF, preferably combined with a fixed-focus lens;
2) Reducing lens aperture, while boosting light source power to compensate;
3) Reducing pixel size, while boosting light source power to compensate; and 4) Using an auto-focus actuator. Although the main purpose of the auto-focus actuator is to focus speedily on objects at "macro" range, e.g. around 10-50 cm, for iris scanning, the actuator may also focus at longer distances up to infinity for applications described below.

It should be noted, EDOF systems were historically utilized for color capture and experienced some issues capturing and correcting images across all visible wavelengths, resulting in degradation of image quality. Since the present embodiments are capturing a monochromatic NIR image, the issues related to operation across a wide range of wavelengths are eliminated and system performance can improve. Additionally, unlike color sensors typically utilizing Bayer pattern where only one of three colors is sampled at each pixel location, the monochrome sensor samples the image at every pixel location, thus providing EDOF with full information for improved system performance.

Although EDOF systems increase the depth of focus to improve the range where iris pictures may be taken, they also tend to decrease the MTF of the picture. In one embodiment, the image quality may be improved by using known super-resolution techniques to capture several images of the iris and process them to achieve a sharper picture. To achieve this, several pictures may be taken in succession with the sub-window rolling shutter to quickly capture the window of interest 302 multiple times. If there is movement between the frames, image registration can be done before combining. The combining step may use a super-resolution technique, or could instead do a simple signal averaging to reduce noise. In a particular embodiment, this may be combined by synchronizing the NIR pulse with reading out of the window of interest 302 to achieve faster readouts of the window and ameliorating effects of movement within the frame.

Additional Functions

In a further aspect of the exemplary embodiment, the architecture of the biometric camera system 24 enables the biometric camera system 24 to perform additional functions in addition to iris scanning, including proximity sensing, night-vision, 3D time-of-flight sensing, eye position and gaze tracking, and providing a structured light for 3D sensing, as further described below.

Proximity Sensor

Proximity sensors utilize an imaging sensor and a NIR light source. The image sensor typically comprises a single pixel (not array of multiple pixels) and the proximity operation may comprise:

1) Capturing a first signal with the image sensor and measuring a first intensity of ambient light;
2) Enabling the NIR light source;
3) Capturing a second signal with the image sensor and measuring a second intensity of ambient and any reflected NIR light from the object/subject in proximity;
4) Disabling the NIR light source; and
5) Determining a difference between the first and second intensity of ambient light measurements, where a signal difference surpassing a threshold indicates an object present in proximity. In the exemplary embodiment, the sensor with shutter and NIR light captures pictures with and without an NIR light source flash, (optionally) sums pixel outputs in each image and subtracts the two values.

Note that proximity sensors are typically designed to have a high dynamic range, such that they work outdoors in high ambient light. When a GaAs shutter is used, the shutter can open for a very short time (synchronized with the NIR light source pulsing) and thus greatly reduce the exposure from the ambient light. Therefore, the high dynamic functionality may not be necessary, thus potentially reducing imager cost and increasing image quality.

Typically, every smartphone is equipped with a proximity sensor to turn off the touch screen while the user is holding the phone against his/her ear to prevent accidental touch input. Thus, importantly, since the biometric camera system 24 may perform the function of the proximity sensor, the proximity sensor may be removed from the phone, and replaced with the biometric camera system 24 without sacrificing the functionality and without unnecessarily growing smartphone size and cost. Exemplary embodiments also may reuse an already-existing NIR light source for both proximity sensing and biometric scanning.

Night Camera

Since the biometric camera 28 utilizes NIR and an NIR light source 20, the biometric camera 28 can capture images in darkness. The system 24 can also detect a user in total darkness, scan an iris, capture user gestures and so on. Utilizing an auto-focus actuator instead of a fixed-focus (preferably EDOF) lens may be beneficial to be able to clearly capture objects distances further than 25 cm.

3D Time-of-Flight Sensor

An off-the-shelf CMOS camera equipped with a fast GaAs shutter and NIR light source is capable of capturing distance images. For example, a time-of-flight camera is a class of scannerless LIDAR, in which the entire scene is captured with each laser or light pulse. It should be noted that the distance measured to an object (e.g., a face) by the time-of-flight camera can be used for fast focusing using the auto-focus actuator.

Eye Position Detection and Gaze Tracking Camera

The availability of NIR light source 20 and NIR biometric camera 20 allows capturing iris and eyes continuously to track their location and gaze direction using existing techniques.

Motion Detection

The NIR biometric camera 28 can be used to detect motion, including motion in complete darkness, by utilizing imaging techniques known in the field (e.g., capturing frames and comparing their aggregated sharpness).

Structured Light for 3D Sensing

A patterned slide can be inserted in front of the NIR light source 20 to implement 3D sensing. The pattern will be reflected off the object being imaged and then captured by the biometric camera 28. By comparing the relative distortion of the pattern between imager and projected version, the absolute distance of points on the object can be determined.

Typically structured light capture can only be used for imaging static scenes at high resolution because moving objects change position too rapidly to update the depth map without blur. Furthermore, in bright ambient light conditions, structured lighting depth capture systems suffer from wash out.

In this system, the fast shutter and a strong NIR light source 20 can mitigate against both of these issues. The problem of ambient wash out may be reduced if another NIR light source is added with a patterned slide that has a complementary pattern to the pattern on the first slide. For example, if the new slide has a pattern inverse to the first pattern, then an object can be rapidly illuminated with the first NIR light source and then the second, synchronized with the fast shutter, and then create a higher resolution pattern by using standard computational imaging operations on the two captured patterns. This would enable, e.g., 3D video capture, or the ability to track small changes in facial expression of a person holding the camera in front-facing mode.

3D Face Recognition for Biometrics

In the previous embodiment described above, the system can use the fast shutter and a structured light pattern over the IR illuminator to capture high precision, low blur, 3D depth maps of a person's face, paired with the RGB images of the face, captured from the standard front-facing camera. In this embodiment, the field of view of the NIR camera is designed to be wide enough to capture the entirety of the user's face at the target distance range for the application (typically 10 cm-25 cm). These 3D depth maps and RGB image pairs can be used to create a 3D model of a person's face, which can then be used to create a biometric signature, unique to that user. A benefit of this embodiment is that the same system setup can be used to simultaneously capture the person's iris image and 3D facial image, allowing for multi-factor authentication. Capture of the iris and 3D face may be done with the same IR image, or there may be possibly two IR illuminators, one with the structured light pattern on top of it and the other with no pattern on top. This can potentially simplify the processing of the image which would be needed to remove the structured light pattern from the iris image. The same camera could be used in rapid alternating sequence to capture iris and 3D face images.

Capture with Addressable Shutter

Figure 4A:
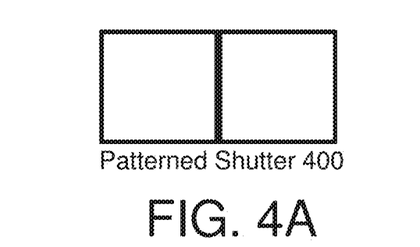
FIGS. 4A, 4B and 4C are diagrams showing one emboidmetn in which a shutter is patterned into left and right halves.
Figure 4B:
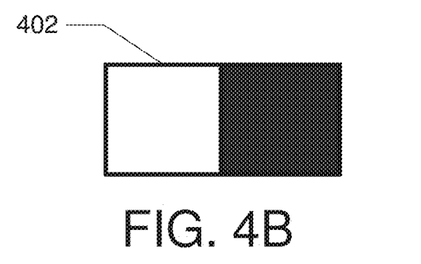
Figure 4C:
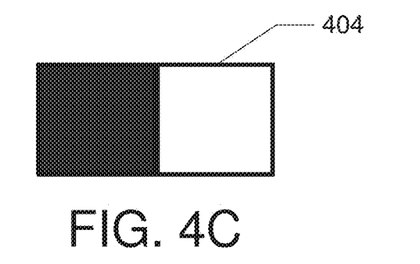

In some previous embodiments, the solid-state shutter of the biometric camera 28 is addressable with a single set of electrodes and covers the entire field of view of the shutter. In one embodiment, electrodes may be patterned on the shutter so that there are two or more separately addressable areas of the shutter, that is, one portion of the shutter could be left open to the wavelengths of light measured while the other portion or portions could remain closed. FIGS. 4A, 4B and 4C are diagrams showing one embodiment in which a shutter 400 is patterned into left and right halves. FIG. 4B is a diagram showing the left half 402, and FIG. 4C is a diagram showing the right half 404. Here, alternate pictures can be taken with each half successively blocked while the other side remains open. For example, a 3D stereo image may be captured through single lens technology with time-multiplex. A left stereo pair image may be captured with the left half 402 of the shutter 400 transparent and the right half 404 opaque. A right stereo pair image may be captured with the right half 404 of the shutter 400 transparent and the left half 402 opaque. The left and right captured images can then be processed using known techniques to provide stereo pair images using a single lens camera. In this application, strong ambient lighting might be used to capture the images. In a particular embodiment, the NIR light source may also be used to supplement or replace ambient light. The NIR pulses may be synchronized to the timing of the shutter halves while increasing exposure lighting without exceeding eye safety limits.

Figure 5A:
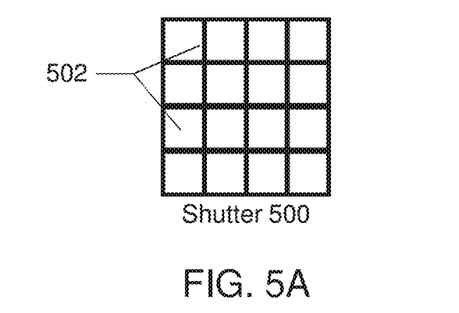
FIGS. 5A and 5B are diagrams showing an example of the shutter subdivided into more independently addressable areas so the biometric camera can be used as a plenoptic camera.
Figure 5B:
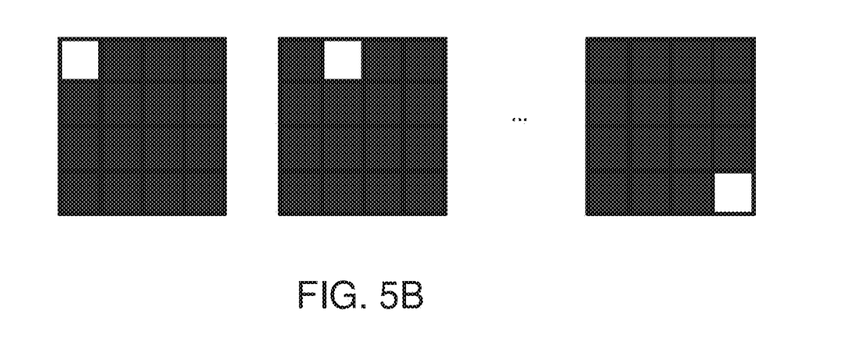

In another embodiment, the shutter of the biometric camera 28 may be further subdivided into more independently addressable areas to create a patterned shutter with time-multiplex for the capture of light-field photos. FIGS. 5A and 5B are diagrams showing an example of the shutter 500 subdivided into more independently addressable areas 502 so the biometric camera can be used as a plenoptic camera. In this example, successive frames may be taken, each with on of the areas 502 of the shutter 500 opened during its frame capture. The series of captured frames can then be processed as a light field image set. Although FIG. 5B shows an example of only a single addressable area 502 open at one time for a frame capture, in another embodiment, multiple areas 502 of the shutter could be open at the same time in various patterns.

Combined Use with RGB Camera

Since the biometric camera 28 may have a relatively narrow field of view (~30 degrees horizontal), it may not always capture the image of the entire user face, but only an image of one eye. To decide which eye this is—left or right—the output of the front-facing camera 18 may be combined to determine which of the eyes is being imaged by the biometric camera 28. The image from the front-facing camera 18 may provide information regarding the position of the face with respect to the field of view imaged by the biometric camera 28.

Other combined uses include:

1) The time-of-flight operation can be used to assist the front-facing camera 18 for focusing;
2) The front-facing camera 18 can also automatically capture user's face during the iris scan, e.g. for reference purposes;
3) The front-facing camera 18 can capture the user's face to concurrently with the iris scan to additionally verify that the user is a living human (e.g. by tracking pulse using known methods based on spatio-temporal filtering and amplification of color);
4) The front-facing camera 18 may confirm the presence and determine the position of the user's head and eyes during iris scan to assist recognition in case of problems with head positioning, such that the system can guide the user to position his/her head properly (and also e.g. by showing the user a target to look at on the display or e.g. flash LED on the phone); and
5) The front-facing camera can detect the presence of glasses, hair and identify other problems preventing successful iris scan. The system (e.g., smartphone) can then direct the user to address these problems, e.g. remove glasses, adjust hair and track and verify that the problems are addressed using the front-facing camera.

A method and system for a biometric camera system has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

We claim:

1. A biometric camera system for a mobile device, comprising:

a near infrared (NIR) light source on the mobile device that illuminates a user of the mobile device with near infrared light during image capture;

a biometric camera located on the mobile device offset from the NIR light source, the biometric camera comprising:

an extended depth of field (EDOF) imaging lens; and an imaging sensor adjacent to the EDOF imaging lens that converts an optical image of an object into an electronic signal for image processing;

a solid-state shutter between the EDOF and the imaging sensor, the solid-state shutter having at least two separately addressable shutter areas, such that successive frames may be captured, each with at least one of the separately addressable shutter areas opened during the frame capture; and a processor configured to receive video images of an iris of a user from the image sensor and attempt to match the video images of the iris with previously registered images stored in an iris database, wherein if a match is found, the user is authenticated.

2. The system of claim 1, wherein the solid-state shutter comprises gallium arsenide (GaAs).

3. The system of claim 1, wherein the image sensor further includes at least one of a rolling shutter and a freeze-frame shutter.

4. The system of claim 1, further comprising further comprising:
a bandpass filter adjacent of the EDOF to reject ambient light during image capture.

5. The system of claim 4, further comprising a visible light filter located adjacent to the bandpass filter that rejects visible light.

6. The system of claim 1, wherein the processor is further configured to reduce exposure from ambient light by:
starting exposure of the image sensor; and
reducing readout time by identifying an iris position on a user from a previously captured image and defining a window of interest around the iris position, and subsequently capturing and reading out from a portion of the image sensor defined by the window of interest.

7. The system of claim 1, wherein the image sensor comprises a rolling shutter and wherein the NIR light source is synchronously pulsed with the readout of the rolling shutter.

8. The system of claim 1, wherein the NIR light source and the biometric camera are used for at least one of: a night camera, a 30 time-of-flight sensor, eye position detection and gaze tracking; and motion detection.

9. A biometric camera system for a mobile device, comprising:
a near infrared (NIR) light source on the mobile device that illuminates a user of the mobile device with near infrared light during image capture;
a biometric camera located on the mobile device offset from the NIR light source, the biometric camera comprising:
an extended depth of field (EDOF) imaging lens; and
an imaging sensor adjacent to the EDOF imaging lens that converts an optical image of an object into an electronic signal for image processing; and
a processor configured to receive video images of an iris of a user from the image sensor and attempt to match the video images of the iris with previously registered images stored in an iris database, wherein if a match is found, the user is authenticated; wherein the processor is further configured to implement a proximity sensor operation by:
capturing a first signal with the image sensor and measuring a first intensity of ambient light;
enabling the NIR light source;
capturing a second signal with the image sensor and measuring a second intensity of ambient light and any reflected NIR light;
disabling the NIR light source; and
determining a difference between the first and second intensity of ambient light measurement, wherein a signal difference surpassing a threshold indicates an object present in proximity.

10. A biometric camera system for a mobile device, comprising:
a near infrared (NIR) light source on the mobile device that illuminates a user of the mobile device with near infrared light during image capture, wherein NIR light is covered with a structured light pattern to implement 30 sensing;
a biometric camera located on the mobile device offset from the NIR light source, the biometric camera comprising:
an extended depth of field (EDOF) imaging lens; and
an imaging sensor adjacent to the EDOF imaging lens that converts an optical image of an object into an electronic signal for image processing; and
a processor configured to receive video images of an iris of a user from the image sensor and attempt to match the video images of the iris with previously registered images stored in an iris database, wherein if a match is found, the user is authenticated.

11. A biometric camera system for a mobile device, comprising:
a front-facing camera;
a near infrared (NIR) light source on the mobile device that illuminates a user of the mobile device with near infrared light during image capture, the NIR light source being covered with a structured light pattern to implement 30 sensing;
a biometric camera located on the mobile device offset from the NIR light source, the biometric camera comprising:
an extended depth of field (EDOF) imaging lens; and
an imaging sensor located adjacent to the EDOF that converts an optical image of an object into an electronic signal for image processing; and
a processor configured to:
use the front-facing camera to capture RGB images of a user's face;
use the NIR light source with the structure light pattern and the biometric camera to capture one or more 30 depth maps of the user's face;
use the RGB images and the one or more 30 depth maps to create a 30model of the user's face; and
use the 30 model to create a biometric signature for the user.

12. The system of claim 11, wherein the biometric camera system is used to simultaneously capture an image of the user's iris to perform multi-factor authentication based on iris detection and 30 model detection.

13. The system of claim 11, wherein the image sensor further includes at least one of a rolling shutter and a freeze-frame shutter.

* * * * *